UNITED STATES PATENT OFFICE.

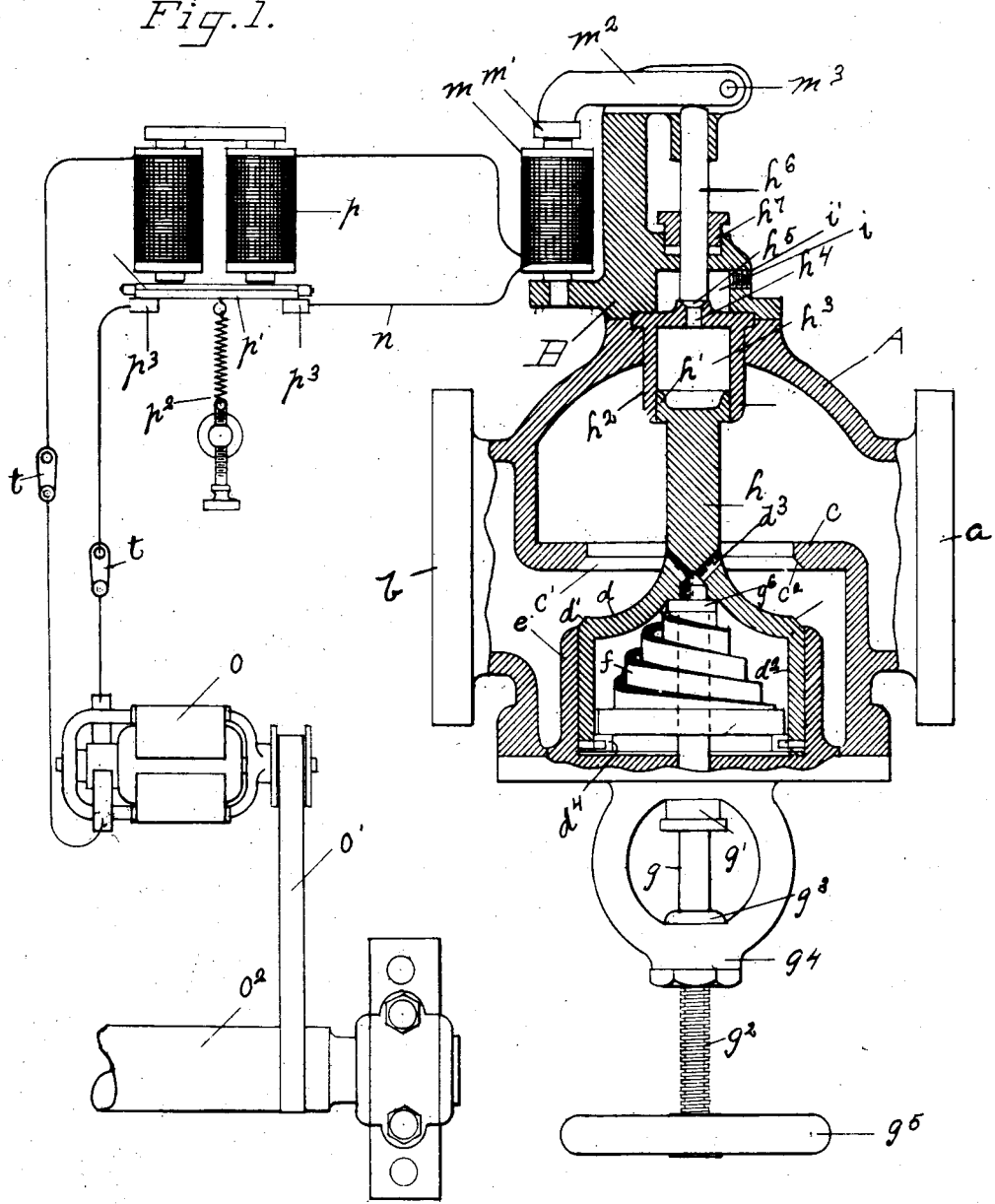

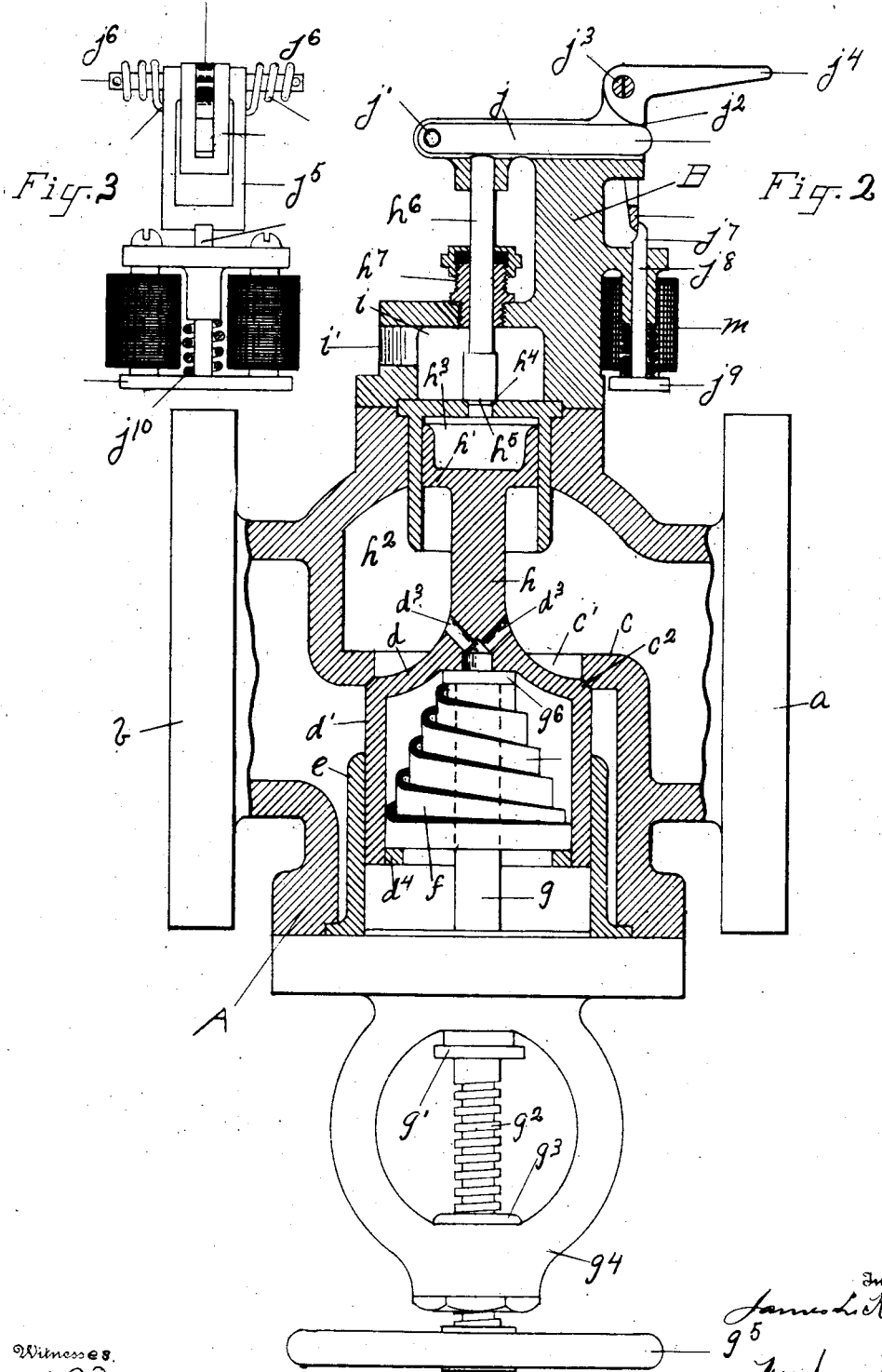

JAMES L. KIMBALL, OF SALEM, MASSACHUSETTS.

ENGINE STOP-VALVE.

No. 869,248.   Specification of Letters Patent.   Patented Oct. 29, 1907.

Application filed June 29, 1906. Serial No. 324,002.

*To all whom it may concern:*

Be it known that I, JAMES L. KIMBALL, of Salem, county of Essex, State of Massachusetts, have invented an Improvement in Engine Stop-Valve and Means for Operating It, of which the following description, in connection with the accompanying drawings, is a specification, like characters on the drawings representing like parts.

This invention relates to engine stop valves and means for operating the same.

The engine stop valve is electrically controlled, and the object of the invention is to provide improved means for operating said valve, which is controlled or operated by the engine, whereby the valve will be closed whenever the speed of the engine exceeds its maximum for safety.

The invention consists in providing a normally closed circuit for the electro-magnet which controls the operation of the valve, a dynamo included therein which is adapted to be operated by the engine, and means operated by an increase in the strength of the current for opening said circuit to cause the magnet to close the valve; also, in providing said normally closed circuit with circuit-breakers adapted to be operated manually or otherwise for opening the circuit and thereby causing the magnet to close the valve; also, in providing the engine stop valve with hand actuating means for opening and closing it independently of the automatic means, whereby said valve may be employed as the throttle valve, if desired.

Figure 1 shows in vertical section an engine stop valve provided with means embodying this invention, and shown diagrammatically, for operating it. Fig. 2 is a vertical section of a modified form of engine stop valve. Fig. 3 is a detail of the electro-magnet and means operated by it for controlling operation of the valve shown in Fig. 2.

An engine stop valve such as may be employed in carrying out my invention will be first described.

The valve case A is of any suitable construction, having an inlet $a$, and an outlet $b$, and containing a partition wall $c$ provided with a passage $c'$ through it, which is formed or provided with a valve seat $c^2$. A disk casting is contained in the valve-case, at the outlet side of the partition wall, which is formed at $d'$ to engage the valve seat $c^2$ and is movable toward and from said seat. It has a cylindrical portion $d^2$, like unto a piston, which is contained in a cylinder $e$ secured to the valve-case. The cylindrical portion $d^2$ loosely fits the cylinder $e$ so as to provide for the passage of the steam between them. The cylindrical portion $d^2$ is made hollow to form a steam-receiving compartment or chamber back of the disk $d$ and the steam entering said compartment or chamber balances the disk. A volute spring $f$ is contained in said compartment or chamber.

A stem $g$ passes through a gland $g'$ in the valve-case, and extends axially through the hollow cylindrical portion $d^2$ and engages or is adapted to engage the disk $d$. The stem $g$ has a threaded portion $g^2$ which passes through a nut $g^3$ in a yoke $g^4$, (or it may be a threaded hole in the yoke), and has secured to its outer end a hand-wheel $g^5$ by which it may be turned. The inner end of the stem $g$, has a flange $g^6$ which engages the disk $d$.

Small holes $d^3$ extend through the disk $d$ at or near its center, which provide passages for the steam into the hollow cylindrical portion $d^2$. These passages are substantially closed by the end of the stem $g$.

The upper end of the volute spring $f$ bears against the flange $g^6$, and the lower end of said spring bears upon a flange or ring $d^4$ which is secured to the lower end of the cylindrical portion $d^2$ of the disk, or is otherwise connected with said portion. The normal tendency of the volute spring is to extend, and pressing at one end against the flanged end of the stem $g$, and at the other end against the ring $d^4$, holds the disk $d$ in engagement with the end of the stem, as shown in the drawings, just as if said stem was directly connected with the disk, although the purpose of said spring is to provide a flexible or yielding connection between the disk and stem, whereby the disk may be moved independently of the stem, as will be described.

The hand wheel and stem operated by it constitute the hand actuating means for opening and closing the valve, and will be operated in the usual manner, as for instance, when it is desired to open the valve, the hand wheel will be turned, and the stem will be turned by it and also moved longitudinally and through the spring will cause the disk to move in a direction away from its seat. To close the valve, the hand wheel will be turned in the opposite direction and the disk moved into engagement with its seat. As the disk is moved by the hand wheel, its relative position to the stem $g$ remains unchanged. Normally the valve will be open and the disk $d$ will occupy the position shown in Fig. 1 and when in such position it will be balanced by the steam contained in the compartment or chamber back of it which enters said compartment or chamber by passing between the loosely fitting cylindrical portion and the cylinder.

The balanced disk $d$ has a centrally disposed stem $h$ which extends through the valve opening $c'$ and bears at its extremity a piston $h'$ which is contained in a cylinder $h^2$ fixed to the valve-case. The piston $h'$ assists in guiding the disk $d$, but essentially serves, under certain conditions, as an actuator for said disk, operating to close it upon its seat.

A chamber $h^3$ is formed or provided in the cylinder $h^2$ back of the piston $h'$, which may be increased in size by recessing the piston, and the steam enters this chamber by passing the piston, which, it will be understood, loosely fits the cylinder $h^2$. The chamber $h^3$ has an outlet $h^4$ which is normally closed by a valve $h^5$ formed on the end of a stem $h^6$ which passes through a stuffing-box $h^7$ fitted into an auxiliary casing B which is mounted on top of the valve-case A.

The auxiliary valve casing B has a chamber $i$ through which the valve stem $h^6$ passes, and the opening $h^5$ communicates with said chamber, so that when the valve is opened, the steam from the chamber $h^3$ is free to enter into the chamber $i$. The chamber $i$ has an outlet $i'$ leading to the atmosphere so that the chamber $h^3$ may be exhausted when the valve $h^4$ is opened.

When the valve $h^4$ is closed, the piston $h'$ is balanced by the pressure of steam upon each side of it, but when the chamber $h^3$ is exhausted, the pressure upon the under side of said piston moves it and consequently moves the balanced disk $d$ toward and closes it upon its seat, and during such movement of the disk, the spring $f$ will be compressed; compression of the spring thereby permits the disk to be moved independently of the stem $g$.

For the purpose of automatically closing the valve $d$, it will therefore be seen that it is here designed to open the auxiliary valve $h^4$ and to accomplish this result, means are provided which are controlled by an electro-magnet which is included in a circuit adapted to be operated from a distant point, and by any suitable means.

As shown in Fig. 1, the valve $h^4$ is held closed by an electro-magnet $m$, the armature $m'$ of which is attached to an arm $m^2$, pivoted at $m^3$ to the auxiliary casing, and the said arm $m^2$ overlies the upper end of the valve-stem $h^6$ and holds the auxiliary valve closed when the armature is in its attracted position. The electro-magnet $m$ is included in and controlled by a normally closed circuit $n$, so that the armature $m'$ is normally held attracted. A dynamo $o$ is included in said circuit $n$, which supplies the current therefor and said dynamo is connected by a belt $o'$ or otherwise to a shaft $o^2$ of the engine, which is being controlled, hence the dynamo is driven by the engine, and while the engine is running at normal speed a current of predetermined strength will be generated, which holds the armature of the magnet $m$ attracted, and the auxiliary valve closed. Whenever said circuit $n$ is opened, the armature $m'$ will be retracted and the auxiliary valve opened and the disk $d$ closed upon its seat independently of the hand-actuating means provided for operating it.

It is designed to open the circuit $n$ by means operated by an increase in the strength of the current above the normal, and for this purpose a relay-magnet $p$ is included in the circuit, the armature $p'$ of which is normally held retracted by a spring $p^2$ against the attractive force of the magnet. The armature $p'$ when retracted closes upon a pair of contacts $p^3$ included in the circuit and when in engagement therewith maintains the circuit closed. Whenever the armature is removed from engagement with said contacts $p^3$, the circuit will be open, but to thus move said armature, the strength of the current must increase sufficiently for the attractive force of the relay magnet $p$ to overcome the force of the retractile spring $p^2$, and this takes place whenever the dynamo is driven at an excessively high speed, due to the speed of the engine exceeding its maximum for safety. The circuit $n$ has also other circuit-breakers $t$ adapted to be operated manually or otherwise to open the circuit and operate the magnet to close the engine stop valve.

By providing a normally closed circuit for the electro-magnet $m$ it will be seen that any derangement thereof will be made known, which is important.

Referring to Figs. 2 and 3, a modified form of electro-magnetic controlling-device is provided for the auxiliary valve. As herein shown, the valve $h^5$ is held closed by a locking-device engaging its stem $h^6$ which, when released, permits the valve to be opened by the steam pressure upon it. The locking-device consists of a lever $j$ pivoted at $j'$ and overlying the upper end of the valve-stem $h^6$, a cam $j^2$ pivoted at $j^3$ and adapted to engage said lever $j$ and hold it down, said cam having an arm $j^4$ projecting it which is adapted to be struck by an upwardly swinging member $j^5$ and thereby moved to turn the cam and release the locking lever $j$. The member $j^5$ is herein shown as a loop or bail, although it may be an arm, loosely mounted on the horizontally disposed pin $j^3$ to which the cam $j^2$ is pivoted, and one, or it may be two springs $j^6$ are mounted on said pin which are connected at one end to the pin and at the opposite end to the member $j^5$, which act to suddenly lift the member $j^5$ when permitted to act. The member $j^5$ is held down by a latch $j^7$ formed on the upper end of an upright pin $j^8$, which is attached to the armature $j^9$ of the electro-magnet $m$. Assuming the electro-magnet to be included in a closed circuit and its armature $j^9$ normally attracted, the retractile spring $j^{10}$ will be compressed and whenever the electro-magnet is deënergized, the armature will be retracted, the latch $j^7$ moved out of engagement with the member $j^5$ and the springs $j^6$ permitted to suddenly lift the member $j^5$ causing it to strike the arm $j^4$ and turn the cam $j^2$ and release the locking-lever $j$ and thereby permit the auxiliary valve $h^5$ to be opened by the steam pressure upon it. The means thus shown and described for releasing the auxiliary valve represents merely another form of mechanism which may be employed for this purpose in lieu of the mechanism shown in Fig. 1, and so far as my invention is concerned I do not desire to limit it to any particular form of construction of mechanism in releasing the auxiliary valve, nor in fact to any particular mechanism which is controlled by the electro-magnet $m$ for controlling the operation of the engine stop valve.

Having thus described my invention, what I claim as new and desire to secure by Letters Patent is:

1. The combination with an engine stop valve, of an electro-magnet controlling its operation, a normally closed circuit for said magnet, a current generator for said circuit which is operated by the engine which is being controlled and means operated by an increase in the strength of the current for operating said circuit to operate said magnet and thereby operate the valve, substantially as described.

2. The combination with an engine stop valve, of an electro-magnet controlling its operation, a normally closed circuit including said electro-magnet, a dynamo included in said circuit which is operated by the engine which is being controlled, and means operated by an increase in the strength of the current for opening said circuit to thereby cause the magnet to operate the valve, substantially as described.

3. The combination with an engine stop valve, of an electro-magnet controlling its operation, a normally closed circuit for said magnet, a current generator for said circuit which is operated by the engine which is being controlled, a circuit breaker in said circuit, a relay-magnet for operating it, the armature of which is normally held retracted but which is adapted to be attracted upon an increase in the strength of the current to operate said circuit-breaker and open the circuit and thereby cause the valve operating mechanism to operate, substantially as described.

4. The combination with an engine stop valve comprising a main valve and an auxiliary valve controlling its operation, of an electro-magnet for holding said auxiliary valve closed, a circuit for said magnet, a current generator for said circuit, which is operated by the engine which is being controlled and means operated by an increase in the strength of the current for operating said circuit to thereby operate said magnet and open the auxiliary valve, substantially as described.

5. The combination with an engine stop valve comprising a main valve, hand actuating means for moving it toward and from its seat, and an auxiliary valve for closing said main valve upon its seat independently of the hand actuating means, of an electro-magnet for holding said auxiliary valve closed, a circuit for said magnet, a current generator for said circuit which is connected with and operated by the engine which is being controlled, and means operated by an increase in the strength of the current for operating said circuit to operate the magnet and open the auxiliary valve, substantially as described.

6. The combination with an engine stop valve, of an electro-magnet controlling its operation, a normally closed circuit for said magnet, a current generator for said circuit which is operated by the engine which is being controlled and means operated by an increase in the strength of the current for operating said circuit to operate said magnet and thereby operate the valve, and one or more circuit-breakers also in said circuit for opening it to also operate the valve mechanism, substantially as described.

7. The combination with an engine stop valve, of an electro-magnet controlling its operation, a normally closed circuit including said electro-magnet, a dynamo included in said circuit which is operated by the engine which is being controlled, and means operated by an increase in the strength of the current for opening said circuit to thereby cause the magnet to operate the valve, and one or more circuit-breakers also in said circuit for opening it to also operate the valve operating mechanism, substantially as described.

8. The combination with an engine stop valve comprising a main valve and an auxiliary valve controlling its operation, of an electro-magnet for holding said auxiliary valve closed, a normally closed circuit for said magnet, a circuit-breaker in said circuit and means operated by an increase in the strength of the current for operating it to open the circuit and thereby operate the valve operating mechanism, substantially as described.

In testimony whereof, I have signed my name to this specification, in the presence of two subscribing witnesses.

JAMES L. KIMBALL.

Witnesses:
L. H. HARRIMAN.
H. B. DAVIS.